United States Patent
Watanabe

(10) Patent No.: US 7,895,450 B2
(45) Date of Patent: Feb. 22, 2011

(54) DATA MANAGEMENT SYSTEM, DATA MANAGEMENT METHOD AND STORAGE MEDIUM STORING PROGRAM FOR DATA MANAGEMENT

(75) Inventor: Yoshiki Watanabe, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1415 days.

(21) Appl. No.: 11/327,325

(22) Filed: Jan. 9, 2006

(65) Prior Publication Data

US 2007/0162766 A1 Jul. 12, 2007

(51) Int. Cl.
  *G06F 11/30* (2006.01)
  *G06F 12/14* (2006.01)
  G06Q 20/00 (2006.01)
  H04L 9/08 (2006.01)

(52) U.S. Cl. .......................... 713/193; 705/71; 705/72; 380/279; 380/286

(58) Field of Classification Search .................. 713/150, 713/155, 189, 191–193; 705/59, 71, 72; 380/277–279, 284, 286
See application file for complete search history.

(56) References Cited

U.S. PATENT DOCUMENTS

| | | | |
|---|---|---|---|
| 7,100,200 B2* | 8/2006 | Pope et al. | 726/10 |
| 2001/0056541 A1 | 12/2001 | Matsuzaki et al. | |
| 2003/0026431 A1* | 2/2003 | Hammersmith | 380/277 |
| 2004/0098343 A1* | 5/2004 | Kawaki | 705/51 |
| 2005/0027666 A1* | 2/2005 | Beck et al. | 707/1 |
| 2005/0153741 A1* | 7/2005 | Chen et al. | 455/558 |
| 2006/0106727 A1* | 5/2006 | Yellai et al. | 705/59 |
| 2007/0143632 A1 | 6/2007 | Matsuzaki et al. | |

FOREIGN PATENT DOCUMENTS

| | | |
|---|---|---|
| JP | A-08-123758 | 5/1996 |
| JP | A-2001-273262 | 10/2001 |
| JP | A-2002-033727 | 1/2002 |
| JP | A-2002-183563 | 6/2002 |
| JP | A-2002-244986 | 8/2002 |
| JP | A-2002-314706 | 10/2002 |
| JP | A 2002-342168 | 11/2002 |
| JP | A-2002-342169 | 11/2002 |
| JP | A-2002-352094 | 12/2002 |
| JP | A-2003-141429 | 5/2003 |
| JP | A-2003-343133 | 12/2003 |

OTHER PUBLICATIONS

Menezes et al., "Handbook of Applied Cryptography", ISBN 0-8493-8523-7.*

* cited by examiner

*Primary Examiner*—Michael J Simitoski
*Assistant Examiner*—Jahangir Kabir
(74) *Attorney, Agent, or Firm*—Oliff & Berridge, PLC

(57) ABSTRACT

A storage medium is readable by a computer. The storage medium stores a program of instructions executable by the computer to perform a function for data managing. The function includes: receiving an encryption key from a first user terminal; encrypting the encryption key; issuing a first registration code for the encryption key; registering the encrypted encryption key with the encrypted encryption key associated with the first registration code; sending the first registration code to the first user terminal; and when a second registration code sent from a second user terminal is identical with the first registration code, decrypting the registered and encrypted encryption key and sending the decrypted encryption key to the second user terminal.

4 Claims, 7 Drawing Sheets

DATA MANAGEMENT SYSTEM, DATA MANAGEMENT METHOD AND STORAGE MEDIUM STORING PROGRAM FOR DATA MANAGEMENT

The entire disclosure of Japanese Patent Application No. 2004-206483 including the specification, claims, drawings and abstract is incorporated herein by reference in its entirety.

BACKGROUND OF THE INVENTION

1. Field of the Invention

The invention relates to a data management system for improving security, a data management method and a program therefor.

2. Description of the Related Art

Conventionally, various reservation management systems, settlement systems, etc. have been proposed, and these systems are configured so that a user previously registers user information such as a name, an address, a password or a number of a credit card in a server of the service provision side, and predetermined service is received based on the user information.

For example, JP 2002-183563 A discloses a reservation method and a reservation system in which when accommodation facilities etc. are reserved using a mobile communication terminal into which an IC card etc. are built, fee payment and locking/unlocking of the reserved accommodation facilities, etc. can be performed for the reserved period with its mobile communication terminal.

However, in JP 2002-183563 A, there is a problem on security since all the user information about the user necessary to receive service is registered in a server of the service provision side and is held in a state in which other people can access the user information. Because of this, it may be conceived to encrypt user information using a predetermined encryption key and hold this encryption key in only a storage medium of a user terminal. However, there was a problem that the encryption key is lost when the user terminal is renewed.

In the foregoing examples, all of the related art and limitations related thereto are intended to be illustrative and not exclusive. Other limitations of the related art will become apparent to those skilled in the art on a reading of the specification and a study of the drawings.

SUMMARY OF THE INVENTION

The invention has been made under these circumstances and provides a data management system, which can transfer encryption key to a new user terminal even if a user terminal is changed, a data management method and a program therefor.

According to an aspect of the invention, a storage medium is readable by a computer. The storage medium stores a program of instructions executable by the computer to perform a function for data managing. The function includes: receiving an encryption key from a first user terminal; encrypting the encryption key; issuing a first registration code for the encryption key; registering the encrypted encryption key with the encrypted encryption key associated with the first registration code; sending the first registration code to the first user terminal; and when a second registration code sent from a second user terminal is identical with the first registration code, decrypting the registered and encrypted encryption key and sending the decrypted encryption key to the second user terminal.

According to another aspect of the invention, a data management method includes: receiving an encryption key stored in a first user terminal from the first user terminal; encrypting the encryption key; issuing a first registration code for the encryption key; registering the encrypted encryption key with the encrypted encryption key associated with the first registration code in a database; sending the first registration code to the first user terminal; and when a second registration code sent from a second user terminal is identical with the first registration code, decrypting the registered and encrypted encryption key and sending the decrypted encryption key to the second user terminal.

According to still another aspect of the invention, a data management system includes a reception part, an encryption section, an issuing part, a registration part, a sending part and decrypting section. The reception part receives an encryption key stored in a first user terminal from the first user terminal. The encryption section encrypts the encryption key. The issuing part issues a first registration code for the encryption key. The registration part registers the encrypted encryption key in a database while associating the encrypted encryption key with the first registration code. The sending part sends the first registration code to the first user terminal. When a second registration code sent from a second user terminal is identical with the first registration code, the decrypting section decrypts the registered and encrypted encryption key and sends the decrypted encryption key to the second user terminal.

According to the configuration described above, an encryption key is encrypted and registered in the user management database with being associated with a registration code. When a registration code and a security code are sent from a new user terminal, an encrypted encryption key associated with the sent registration code is decrypted using the sent security code. Then, the decrypted encryption key is sent to the new user terminal. Accordingly, the encryption key can be transferred to the new user terminal safely.

DETAILED DESCRIPTION OF EMBODIMENTS OF THE INVENTION

Embodiments of the invention will be described below with reference to the accompanied drawings.

Figure 1:
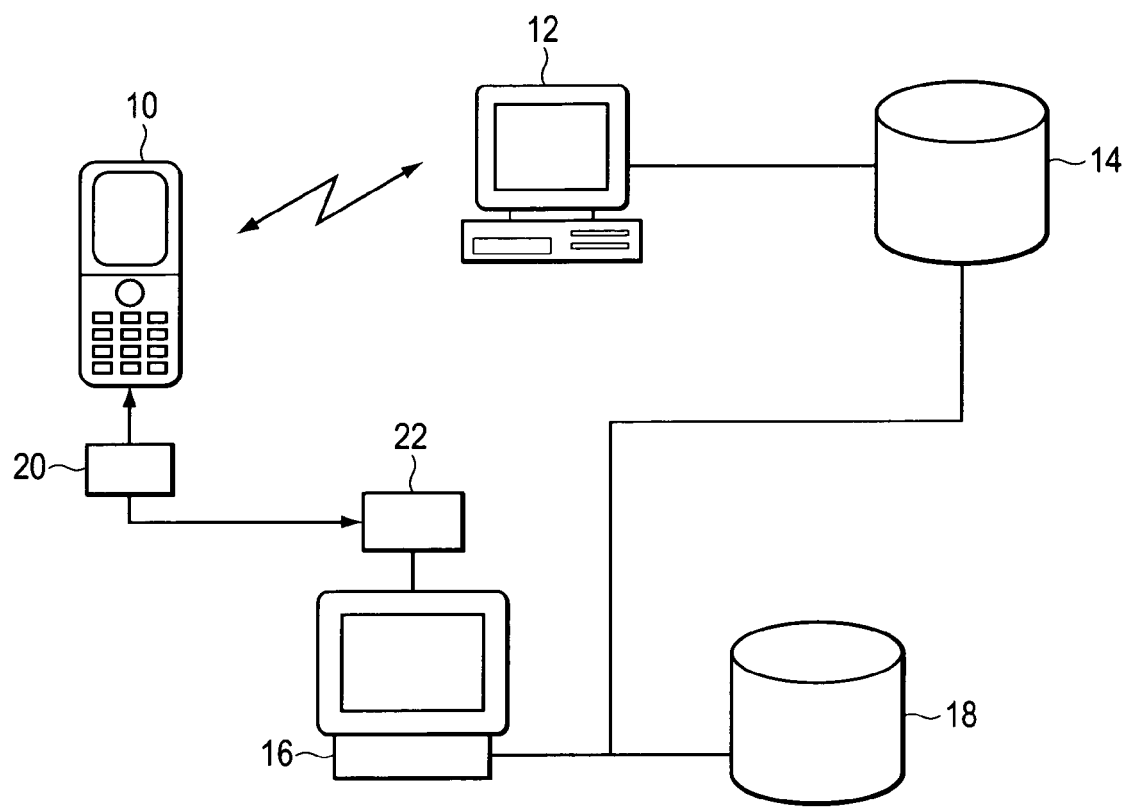
FIG. 1 is a diagram showing configuration of a data management system according to one embodiment of the invention.

In FIG. 1, a diagram shows configuration of a data management system according to one embodiment of the invention. In FIG. 1, a data management system includes a user terminal 10, a user management server 12, a user management database 14, a data access terminal 16 and a database 18.

When a user fetches desired data from the database 18, user information such as a name, an address, a password and a photograph is first sent from the user terminal 10 to the user management server 12. As this user terminal 10, for example, a cellular telephone which includes a browser and can be connected to the Internet can be used.

In the user management server 12, an encryption key used for encrypting all or part of the user information sent from the user terminal 10 is generated and all or part of the user information is encrypted using this encryption key. Also, a hash value is acquired from the encryption key using a hash function and this hash value is used as a user identification code. The user information whose all or part is encrypted is paired with the hash value used as the user identification code and is registered and stored in the user management database 14. Further, the encryption key and the hash value are sent from the user management server 12 to the user terminal 10 and are stored into an IC card 20 used as a storage medium in the user terminal 10. This IC card 20 is not particularly limited, but for example, a contactless IC card is preferably used as a IC card 20. In addition, the user identification code is not limited to the hash value and may be one so long as it can be calculated from the encryption key by a one-way function.

When a user makes the card reader 22 connected to the data access terminal 16 read data stored in the IC card 20, the data access terminal 16 obtains, using a hash value read out of the IC card 20, user information combined with a hash value identical with this hash value from the user management database 14. Since all or part of this user information is encrypted, the data access terminal 16 decrypts the encrypted part among the user information using the encryption key read out of the IC card 20. Using this decrypted user information, the data access terminal 16 accesses the database 18 and reads out data combined with user information identical with the user information. As a result of this, the user can fetch desired data.

In addition, predetermined user information is previously combined with data of documents, images, moving images, sounds, etc. and is stored in the database 18. Also, the database 18 is configured so that only a user authenticated based on the user information can obtain the data. Also, functions of addition, deletion, retrieval, etc. of data are provided.

As described above, if a user does not depend on user information previously registered in the database 18, data cannot be fetched from the database 18 and this user information is encrypted by an encryption key dynamically generated in each case of registration in the user management database 14. Also, an encryption key used in decrypting of user information is stored in only the IC card 20 carried by a user. Therefore, a person other than the user who carries the IC card 20 cannot fetch data from the database 18 and security of the data management system can be improved. Further, since the encryption key is dynamically generated in each case of registration of user information, even when the encryption key is leaked, a different encryption key is generated when the user information is again sent to the user management server 12. Therefore, the terminal can safely be used similarly afterward.

When the user terminal 10 is replaced due to renewal or the like in the data management system described above, an encryption key stored in the IC card 20 together with a security code decided by a user is sent from an old user terminal to the user management server 12.

In the user management server 12, the encryption key sent from the old user terminal is encrypted using the security code. Next, the user management server 12 generates a registration code, and stores and registers the encrypted encryption key together with the registration code in the user management database 14. Also, the registration code is sent to the old user terminal.

The old user terminal displays the registration code sent from the user management server 12 to notify it to a user and also erases the encryption key stored in the IC card 20.

Next, after the user changes the user terminal 10 to a new user terminal, the registration code and the security code are sent from the new user terminal to the user management server 12.

The user management server 12 obtains an encrypted encryption key stored in the user management database 14 together with a registration code identical with the received registration code and decrypts the encryption key using the security code. The decrypted encryption key is sent to the new user terminal.

In the new user terminal, the received encryption key is stored in the IC card 20 and the user management server 12 is notified of that effect. In the user management server 12, the registration code and the encrypted encryption key stored in the user management database 14 are erased when this notification is received.

As described above, the encryption key stored in the IC card 20 of the old user terminal is erased and the encryption key is stored in the IC card 20 of the new user terminal. Also, when an encryption key is temporarily stored in the user management database 14, the encryption key is encrypted. Therefore, the encryption key can be passed safely from the old user terminal to the new user terminal. It is noted that the old user terminal functions as a first user terminal, and that the new user terminal functions as a second user terminal.

Figure 2:
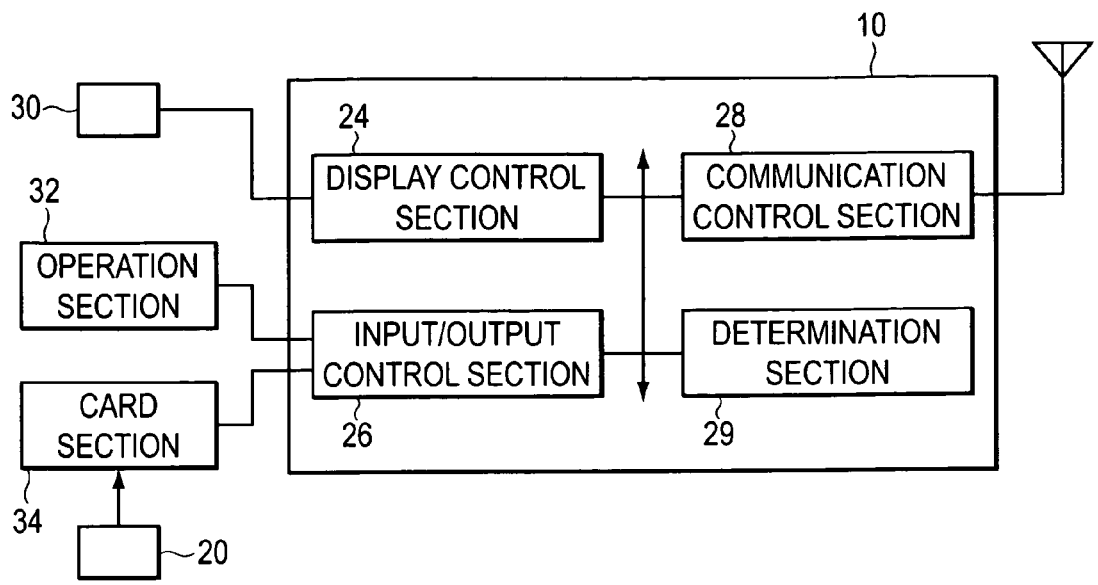
FIG. 2 is a block diagram showing configuration of a user terminal.

In FIG. 2, a block diagram shows configuration of the user terminal 10. In FIG. 2, the user terminal 10 includes a display control section 24, an input/output control section 26, a communication control section 28, a determination section 29, a display part 30, an operation section 32 and a card section 34. In addition, the card section 34 may be attached to the outside.

The display control section 24 controls an operation of displaying a user interface (UI) for obtaining user information from a user on the display part 30. A user inputs predetermined data, operation instructions, etc. from the operation section 32 constructed of pushbuttons etc. based on the display contents of the display part 30. Also, the card section 34 is means for reading and writing the contents of the IC card 20 by inserting the IC card 20 and, for example, executes erasure of the encryption key, writing of the hash value and the encryption key described above. The input/output control section 26 controls input and output of data between the operation section 32 and the card section 34. Also, the communication control section 28 controls communication with the user management server 12, and exchanges the user information, the encryption key, the hash value, the registration code of the encryption key, etc. described above. The determination section 29 determines whether or not decrypting of an encryption key in the user management server 12 succeeds in the case of replacement of the user terminal 10 and whether or not continuation instructions of writing processing of the encryption key into the IC card 20 are inputted, etc.

Figure 3:
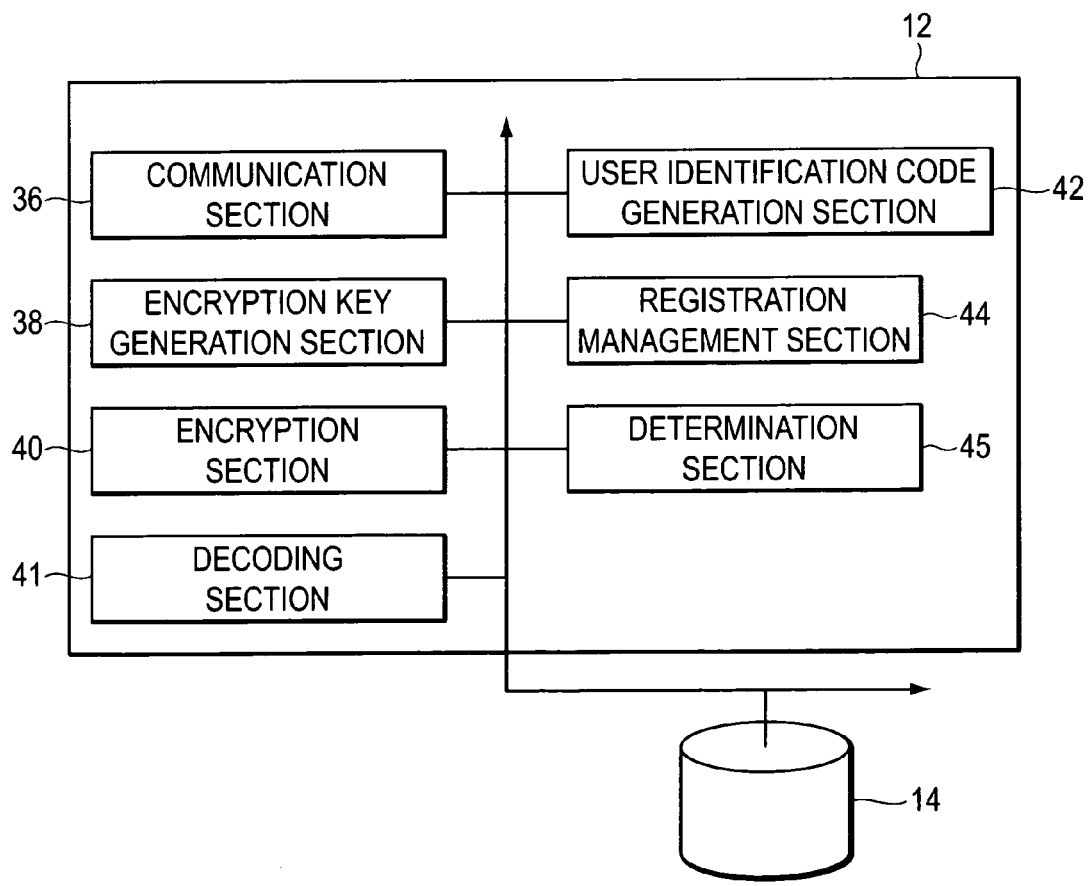
FIG. 3 is a block diagram showing configuration of a user management server shown in FIG. 1.

In FIG. 3, a block diagram shows configuration of the user management server 12 shown in FIG. 1. In FIG. 3, the user management server 12 includes a communication section 36, an encryption key generation section 38, an encryption section 40, a decrypting section 41, a user identification code generation section 42, a registration management section 44 and a determination section 45, and is connected to the user management database 14.

The communication section 36 controls communication with the user terminal 10, and exchanges the user information, the encryption key, the hash value, the registration code of the encryption key, etc. described above. The encryption key generation section 38 dynamically generates an encryption key for encrypting all or part of the user information sent from the user terminal 10 in each case of registration of user information. Also, the encryption section 40 executes encryption of the user information using the generated encryption key. This encryption may be performed with respect to all or part of the user information requiring the encryption. In addition, the encryption section 40 executes encryption of the encryption key using a security code in the case of replacement of the user terminal 10. The user identification code generation section 42 generates a user identification code, and is suitable to generate a hash value of the encryption key using a hash function and use this hash value as the user identification code as described above. The registration management section 44 controls an operation of pairing the encrypted user information with the hash value used as the user identification code and storing the user information in the user management database 14. In addition, the registration management section 44 also generates a registration code of the encryption key in the case of replacement of the user terminal 10. The determination section 45 determines whether or not data corresponding to predetermined user information is stored in the database 18. In addition, the determination section 45 also determines whether or not decrypting of an encrypted encryption key succeeds in the case of replacement of the user terminal 10. Also, when a security code and a registration code are received from a new user terminal in the case of replacement of the user terminal 10, the decrypting section 41 obtains an encrypted encryption key stored in the user management database 14 together with a registration code identical with the received registration code and decrypts the encryption key using the security code.

Figure 4:
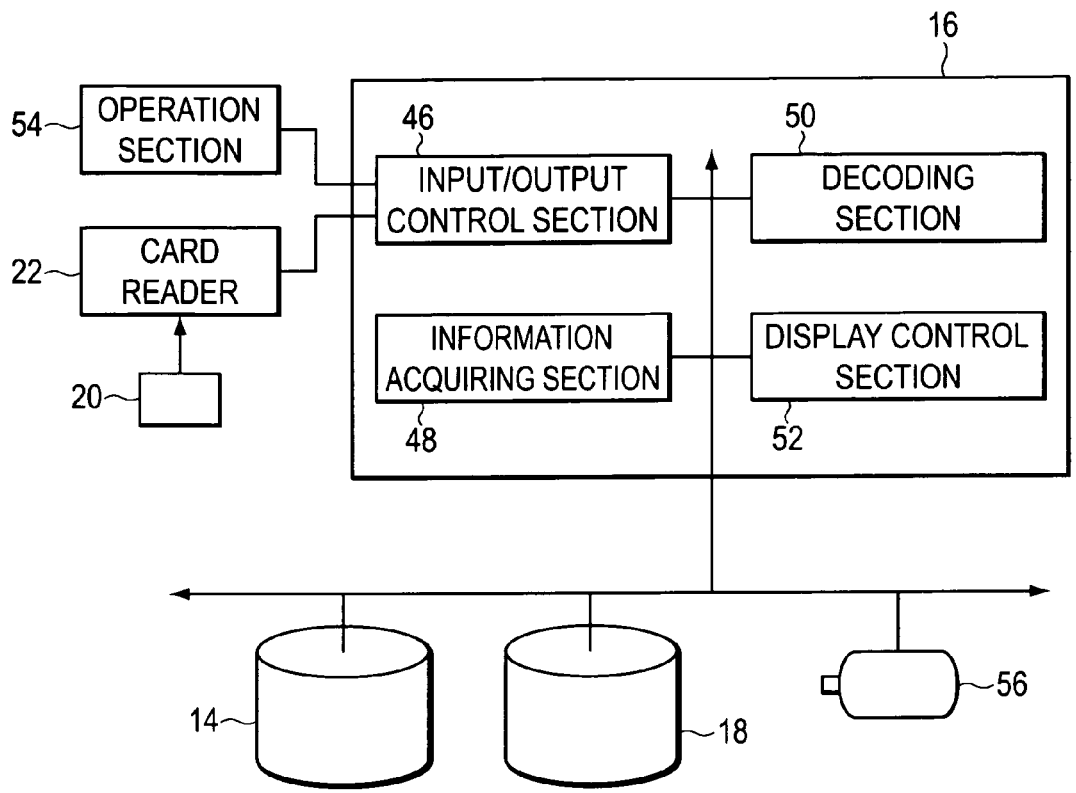
FIG. 4 is a block diagram showing configuration of a data access terminal shown in FIG. 1.

In FIG. 4, a block diagram shows configuration of the data access terminal 16. In FIG. 4, the data access terminal 16 includes an input/output control section 46, an information acquiring section 48, a decrypting section 50, a display control section 52, an operation section 54 and a card reader 22, and is connected to the user management database 14, a display device 56 and the database 18.

The card reader 22 reads an encryption key and a hash value out of the IC card 20. The operation section 54 is constructed of, for example, a touch panel and a user can input predetermined operation instructions, data, etc. The input/output control section 46 controls input and output of the operation instructions, data, etc. between the card reader 22 and the operation section 54. Also, the information acquiring section 48 obtains user information combined with a hash value identical with a hash value used as a user identification code read out of the IC card 20 from the user management database 14. The decrypting section 50 decrypts the encrypted part among the user information obtained from the user management database 14 using an encryption key read out of the IC card 20. Further, the information acquiring section 48 obtains data stored and combined with user information identical with the decrypted user information from the database 18. Also, the display control section 52 displays data obtained from the database 18 on the display device 56 based on an input from the operation section 54. This display device 56 may be, for example, a projector, and displays the data on a predetermined screen.

Figure 5:
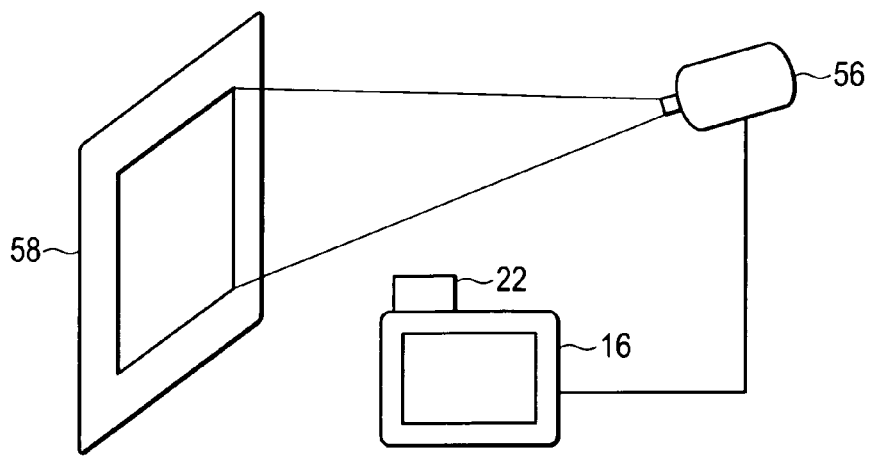
FIG. 5 is a diagram showing a configuration example where data is displayed by a display device shown in FIG. 4.

In FIG. 5, a diagram shows a configuration example where data is displayed by the display device 56. In FIG. 5, the display control section 52 projects the data obtained from the database 18 by the data access terminal 16 as described above on a screen 58 from a projector used as the display device 56 by instructions from the operation section 54 constructed of a touch panel etc. In addition, in FIG. 5, the projector and the screen are shown as a reflective display method, but may be a transparent display method for projecting the data from the back of the screen by the projector.

Figure 6:
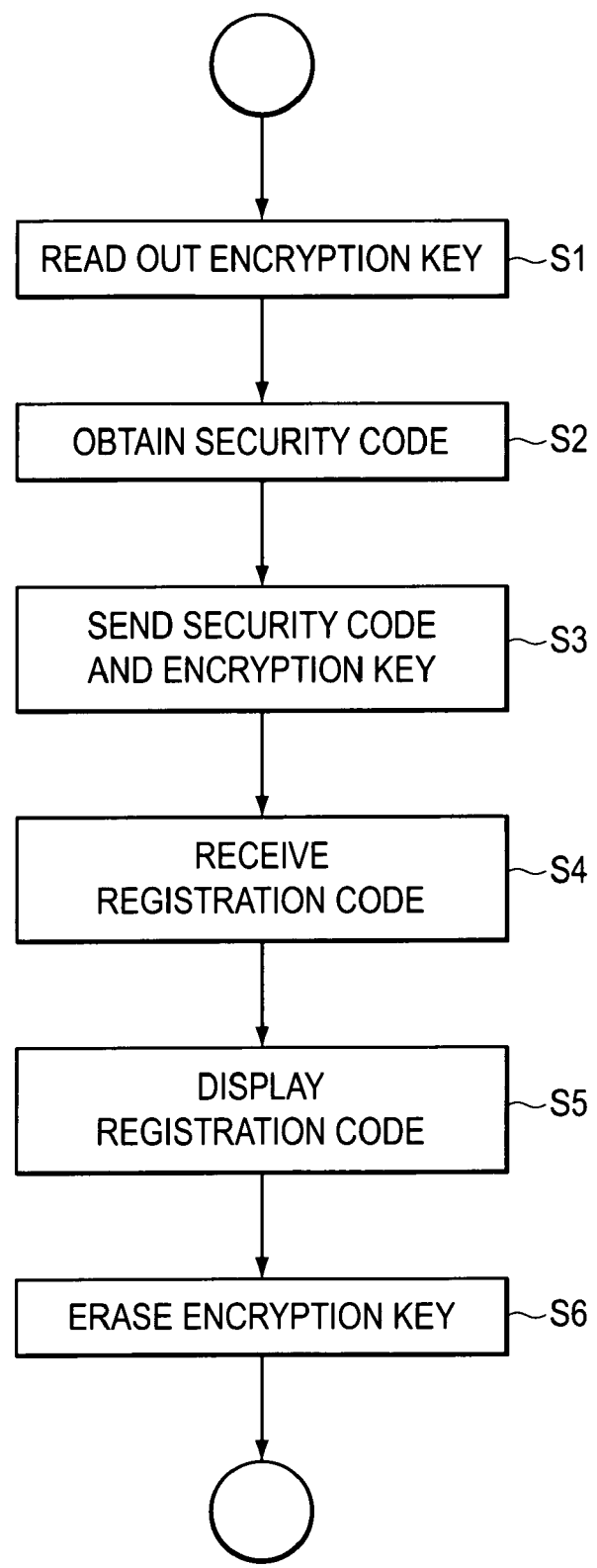
FIG. 6 is a flow chart showing an operation of an old user terminal when the user terminal is replaced.

FIG. 6 is a flow chart showing an operation of an old user terminal when the user terminal 10 is replaced. In FIG. 6, the input/output control section 26 reads an encryption key out of the IC card 20 by the card section 34 (S1). Next, a security code which is decided by a user and is inputted from the operation section 32 is obtained (S2). Then, the communication control section 28 sends the security code and the encryption key to the user management server 12 (S3).

In the user management server 12, after an encryption key sent from an old user terminal is encrypted and is temporarily stored in the user management database 14, a registration code is sent to the old user terminal, so that this registration code is received (S4).

In the old user terminal, the display control section 24 displays the received registration code on the display part 30 (S5), and the input/output control section 26 makes the card section 34 execute erasure of the encryption key stored in the IC card 20 (S6). By the above, the operation in the case of terminal replacement in the old user terminal is ended.

Figure 7:
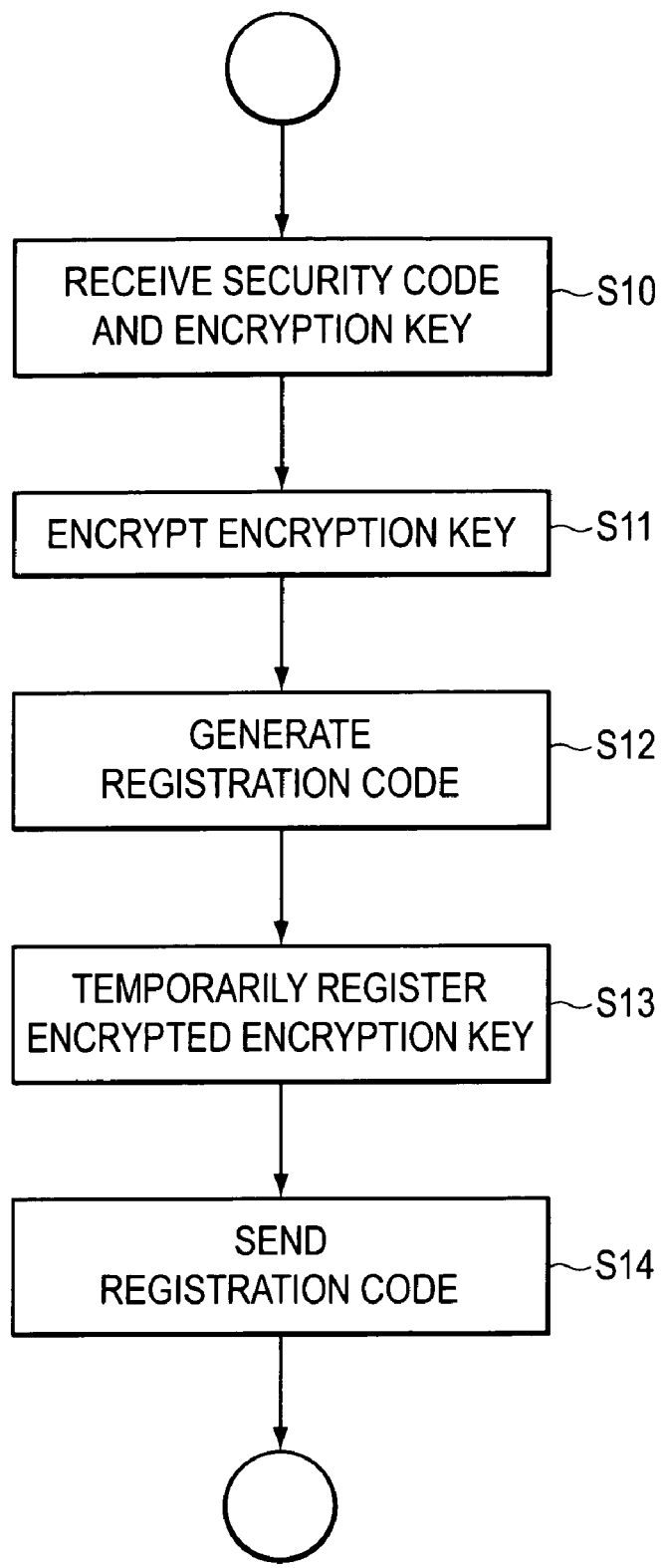
FIG. 7 is a flow chart showing an operation of the user management server when security code and encryption key are sent from the old user terminal.

FIG. 7 is a flow chart showing an operation of the user management server 12 when security code and encryption key are sent from the old user terminal. In FIG. 7, when the communication section 36 receives a security code and an encryption key (S10), the encryption section 40 encrypts the encryption key using the security code (S11). At this time, the registration management section 44 generates a registration code (S12), and temporarily stores and registers the encrypted encryption key together with the registration code in the user management database 14 (S13). Next, the registration code is sent to the old user terminal through the communication section 36 (S14). By the above, the operation in the case of sending the security code and the encryption key from the old user terminal in the user management server 12 is ended.

Figure 8:
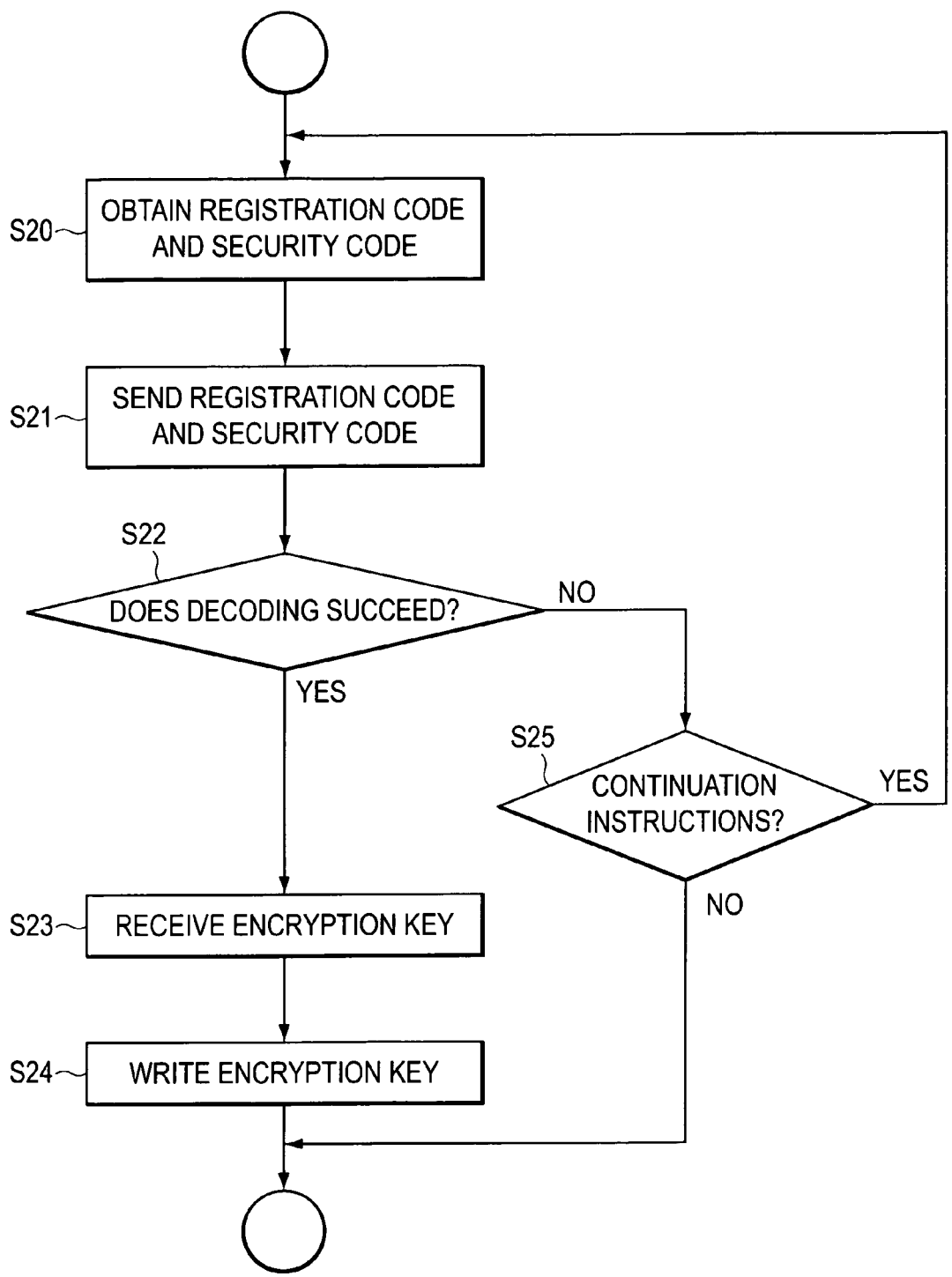
FIG. 8 is a flow chart showing an operation of a new user terminal when the user terminal is replaced.

FIG. 8 is a flow chart showing an operation of a new user terminal when the user terminal 10 is replaced. In FIG. 8, a user inputs a registration code displayed on the display part 30 of an old user terminal and a security code decided by the user from the operation section 32, and the input/output control section 26 of a new user terminal obtains these data (S20).

The communication control section 28 sends the obtained registration code and security code to the user management server 12 (S21). In the user management server 12, an encryption key is decrypted using the received security code and the new user terminal is notified whether or not this decrypting is correctly performed, so that the determination section 29 of the new user terminal determines whether or not decrypting of the encryption key in the user management server 12 succeeds by this notification (S22). When the decrypting succeeds, an encryption key after the decrypting is received from the user management server 12 (S23) and the input/output control section 26 makes the card section 34 write this encryption key on the IC card 20 (S24) and the processing in the new user terminal is ended. Also, at this time, the communication control section 28 notifies the user management server 12 that the encryption key is written on the IC card 20. In addition, when the decrypting succeeds, it may be constructed so that the user management server 12 does not provide notification that the decrypting succeeds and the decrypted encryption key is sent to the new user terminal. In this case, the determination section 29 decides that the decrypting succeeds by receiving of the encryption key.

Also, in the case of determining that the decrypting does not succeed in S22, the display control section 24 displays that effect on the display part 30. A user inputs instructions as to whether or not writing processing of the encryption key is continued from the operation section 32. When continuation instructions are inputted (S25), steps from S20 are repeated. Also, when end instructions are inputted (S25), the processing in the new user terminal is ended.

Figure 9:
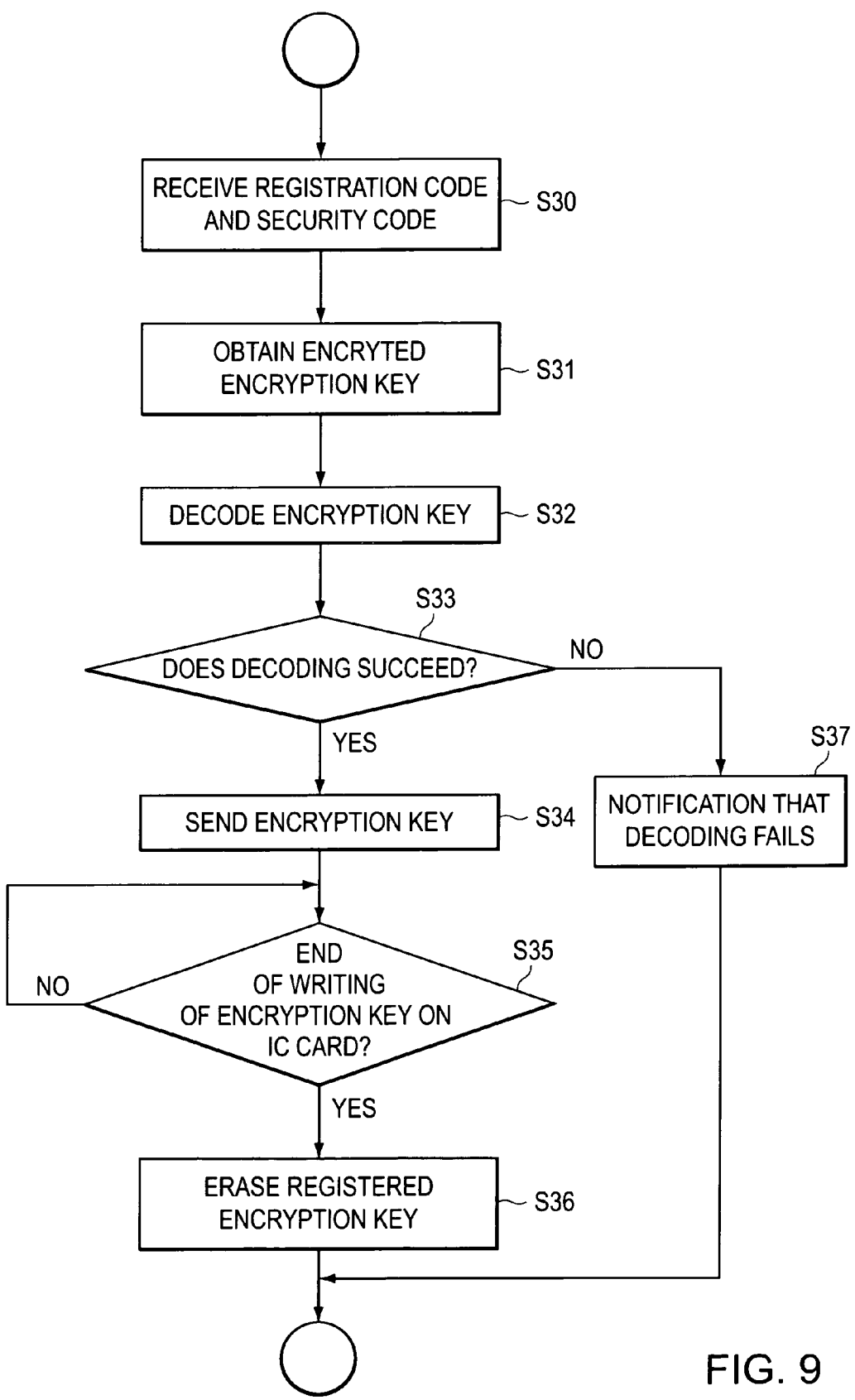
FIG. 9 is a flow chart showing an operation of the user management server when registration code and the security code are sent from the new user terminal.

FIG. 9 is a flow chart showing an operation of the user management server 12 when registration code and the security code are sent from the new user terminal. In FIG. 9, when the communication section 36 receives a registration code and a security code (S30), the registration management section 44 obtains a stored encrypted encryption key together with a registration code identical with the received registration code from the user management database 14 (S31). Since the obtained encryption key is encrypted, the decrypting section 41 performs decrypting using the security code received from the new user terminal (S32).

The determination section 45 determines whether or not the decrypting is correctly performed (S33). The determination whether or not the decrypting of the encryption key succeeds can be made by determining whether or not the registration code encrypted with the encryption key is correctly decrypted. When the decrypting is correctly performed, that effect and the decrypted encryption key are sent to the new user terminal (S34) In this case, when notification that the encryption key is written on the IC card 20 is received from the new user terminal, the determination section 45 determines that writing of the encryption key in the new user terminal succeeds (S35), the registration management section 44 erases the encryption key temporarily stored in the user management database 14 together with the registration code (S36). Also, when the decrypting is not correctly performed, notification that the decrypting fails is sent to the new user terminal (S37). In this case, the encryption key is not sent.

By the above, the processing of the user management server 12 in the case of sending the registration code and the security code from the new user terminal is ended.

According to an aspect of the invention, a storage medium is readable by a computer. The storage medium stores a program of instructions executable by the computer to perform a function for data managing. The function includes: receiving an encryption key from a first user terminal; encrypting the encryption key; issuing a first registration code for the encryption key; registering the encrypted encryption key with the encrypted encryption key associated with the first registration code; sending the first registration code to the first user terminal; and when a second registration code sent from a second user terminal is identical with the first registration code, decrypting the registered and encrypted encryption key and sending the decrypted encryption key to the second user terminal.

The function may further include: receiving a security code from the first user terminal before the encrypting, and receiving a security code from the second user terminal. Said encrypting the encryption key may be performed using the security code sent from the first user terminal. Said decrypting the registered and encrypted encryption key may be performed using the security code sent from the second user terminal.

Also, the function may further include deleting the registered encryption key after said sending the decrypted encryption key to the second user terminal.

According to another aspect of the invention, a data management method includes: receiving an encryption key stored in a first user terminal from the first user terminal; encrypting the encryption key; issuing a first registration code for the encryption key; registering the encrypted encryption key with the encrypted encryption key associated with the first registration code in a database; sending the first registration code to the first user terminal; and when a second registration code sent from a second user terminal is identical with the first registration code, decrypting the registered and encrypted encryption key and sending the decrypted encryption key to the second user terminal.

The data management method may further include: receiving a security code from the first user terminal before the encrypting, and receiving a security code from the second user terminal. Said encrypting the encryption key may be performed using the security code sent from the first user terminal. Said decrypting the registered and encrypted encryption key may be performed using the security code sent from the second user terminal.

Also, the data management method may further include deleting the encryption key from the first user terminal after said sending the first registration code to the first user terminal.

Also, the data management method may further include deleting the encryption key from the database after said sending the decrypted encryption key to the second user terminal.

According to still another aspect of the invention, a data management system includes a reception part, an encryption section, an issuing part, a registration part, a sending part and a decrypting section. The reception part receives an encryption key stored in a first user terminal from the first user terminal. The encryption section encrypts the encryption key. The issuing part issues a first registration code for the encryption key. The registration part registers the encrypted encryption key in a database while associating the encrypted encryption key with the first registration code. The sending part sends the first registration code to the first user terminal. When a second registration code sent from a second user terminal is identical with the first registration code, the decrypting section decrypts the registered and encrypted encryption key and sends the decrypted encryption key to the second user terminal.

Also, the reception part may receive a security code from the first user terminal and receives a security code from the second user terminal. The encryption section may encrypt the encryption key using the security code sent from the first user terminal. The decrypting section may decrypt the registered and encrypted encryption key using the security code.

Also, the data management system may further include a deleting part that deletes the encryption key from the first user terminal after the sending part sends the first registration code to the first user terminal.

Also, the data management system may further include a deleting part that deletes the registered and encryption key from the database after the sending part sends the encryption key to the second user terminal.

While a number of exemplary aspect and embodiments have been discussed above, those of skill in the art will recognize certain modifications, permutations, additions and sub-combinations thereof. It is therefore intended that the following appended claims and claims hereinafter introduced are interpreted to include all such modifications, permutations, additions and sub-combinations as are within the true spirit and scope.

What is claimed is:

1. A data management method comprising:
receiving an encryption key and a security code in a server from a first user terminal, the encryption key being stored in the first user terminal and the security code being input by a user; receiving, a security code from the first user terminal;
encrypting the encryption key in the server, said encrypting the encryption key is performed using the security code sent from the first user terminal;
issuing a registration code for the encryption key;
storing the encrypted encryption key and the registration code in association with each other in the server;
sending the registration code to the first user terminal;
displaying the registration code to the user on the first user terminal;
erasing the encryption key from the first user terminal;
inputting the registration code and the security code on a second user terminal;
receiving the registration code and the security code in the server from the second user terminal;
decrypting the stored and encrypted encryption key in the server using the security code sent from the second user terminal,
when the registration code sent from the second user terminal is identical to the stored registration code,
sending the decrypted encryption key to the second user terminal; and
storing the decrypted encryption key on the second user terminal.

2. The data management method according to claim 1, further comprising:
deleting the encryption key from the server after said sending the decrypted encryption key to the second user terminal.

3. A data management system comprising:
a reception part in a server that receives an encryption key and a security code from a first user terminal, the encryption key being stored in the first user terminal and the security code being input by a user;
an encryption section that encrypts the encryption key in the server using the security code sent from the first user terminal;
an issuing part that issues registration code for the encrypted encryption key;
a storage part that stores the encrypted encryption key and the registration code in association with each other in the server;
a sending part that sends the registration code to the first user terminal;
a displaying part on the first user terminal that displays the registration code to the user;
an erasing part that erases the encryption key on the first user terminal; and
an inputting part on a second user terminal that inputs the registration code and the security code on the second user terminal,
wherein the reception part in the server receives the registration code and the security code in the server from the second user terminal, the server then decrypting the stored and encrypted encryption key in the server using the security code sent from the second user terminal,
when the registration code sent from the second user terminal is identical to the stored registration code,
the sending part sends the encryption key to the second user terminal, and
the second user terminal stores the encryption key in the second user terminal.

4. The data management system according to claim 3, wherein the erasing part erases the stored and encrypted encryption key from the server after the sending part sends the encryption key to the second user terminal.

* * * * *